United States Patent [19]

Bühren

[11] Patent Number: 4,881,227
[45] Date of Patent: Nov. 14, 1989

[54] ARRANGEMENT FOR MONITORING A COMPUTER SYSTEM HAVING TWO PROCESSORS IN A MOTOR VEHICLE

[75] Inventor: Harald Bühren, Bühl, Fed. Rep. of Germany

[73] Assignee: Robert Bosch GmbH, Stuttgart, Fed. Rep. of Germany

[21] Appl. No.: 138,943

[22] Filed: Dec. 29, 1987

[30] Foreign Application Priority Data

Jan. 15, 1987 [DE] Fed. Rep. of Germany ....... 3700986

[51] Int. Cl.⁴ .................. G06F 11/30; G06F 15/16; F02D 41/22
[52] U.S. Cl. .................... 371/9; 364/943.92; 364/431.11
[58] Field of Search .............. 364/187, 431.11, 900; 371/9

[56] References Cited

U.S. PATENT DOCUMENTS

| | | | |
|---|---|---|---|
| 3,898,621 | 8/1975 | Zelinski et al. | 371/9 |
| 4,198,678 | 4/1980 | Maatje et al. | 371/9 |
| 4,200,226 | 4/1980 | Piras | 371/9 |
| 4,245,315 | 1/1981 | Barman et al. | 371/9 |
| 4,270,168 | 5/1981 | Murphy et al. | 371/9 |
| 4,351,023 | 9/1982 | Richer | 371/9 |
| 4,371,754 | 2/1983 | De et al. | 371/9 |
| 4,400,792 | 8/1983 | Strelow | 364/900 |
| 4,521,871 | 6/1985 | Galdun et al. | 364/900 |
| 4,610,013 | 9/1986 | Long et al. | 371/9 |

OTHER PUBLICATIONS

IBM Technical Disclosure Bulletin: Synchronous Multiprocessing Fail Detection; vol. 7, No. 3, Aug. 1964, p. 218.

Primary Examiner—Felix D. Gruber
Attorney, Agent, or Firm—Walter Ottesen

[57] ABSTRACT

The invention is directed to an arrangement for monitoring a computer system with two processors in a motor vehicle. The arrangement provides that the two processors monitor each other to the same extent and that this monitoring occurs in the form of a hand-shake operation in the context of a cyclical data exchange between both processors. In this connection, it is especially advantageous that both processors: can operate fully independently of each other; need not utilize a directly coupled or common I/O-bus; and, are mutually asynchronously operable with different clock frequencies. The arrangement provides a mutual monitoring of two processors to the same extent so that a failure can be localized when it occurs. In this way, the arrangement can distinguish whether a processor has failed or whether an error is present in the peripheral hardware of the processors. For this purpose, the above-mentioned cyclical data exchange between both processors is utilized as an acknowledgement path for the monitoring function.

4 Claims, 1 Drawing Sheet

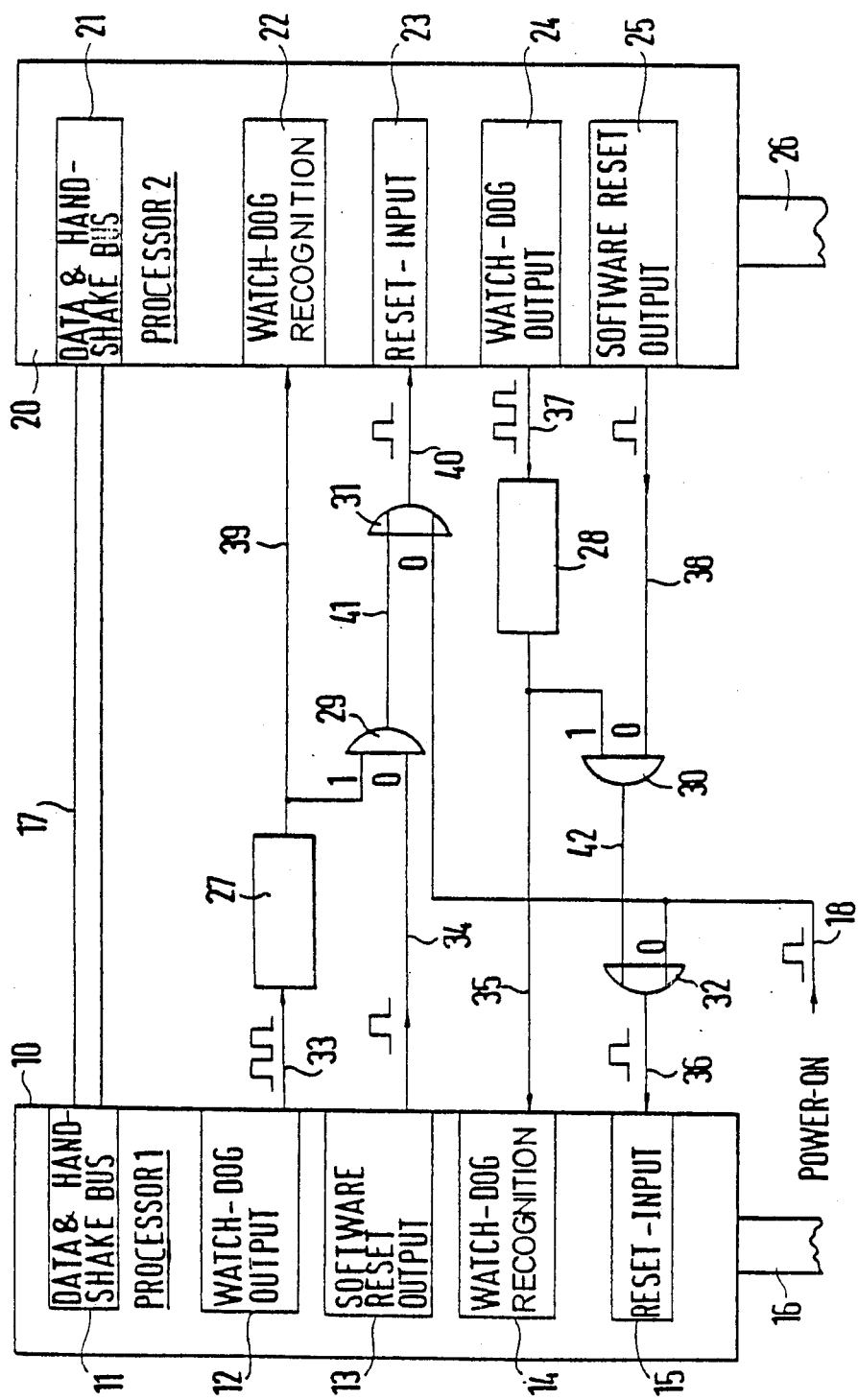

4,881,227

ARRANGEMENT FOR MONITORING A COMPUTER SYSTEM HAVING TWO PROCESSORS IN A MOTOR VEHICLE

FIELD OF THE INVENTION

The invention relates to an arrangement for monitoring a computer system with two processors in a motor vehicle with both processors being hard-wired with each other by means of special gates via data and control leads.

BACKGROUND OF THE INVENTION

Multi-computer systems with a division of functions are known wherein a main computer in normal operation, which is the trouble-free condition, makes available the total computer capacity for the required closed-loop and open-loop control functions. A second computer serves exclusively as an emergency computer and can take over emergency functions in the event that the main computer becomes defective and can thereby maintain at least a limited operation. As long as no disturbance is present, the emergency computer generally remains unused. In such systems, the main computer is in any event monitored. If a suitable monitoring arrangement detects a disturbance or a defect, the emergency computer takes over the tasks of the main computer at least partially or in their entirety.

U.S. patent application Ser. No. 081,459 filed on June 25, 1987 corresponds to PCT/DE86/00407 and is incorporated herein by reference. This application discloses a computer system with two processors for controlling characteristic quantities of an internal combustion engine. Two sensors are provided for the two processors, one of which supplies measured values to the main computer and the other of which supplies measured values to the emergency computer. Both computers are so configured that they can deliver the same processing capacity. However, the emergency function realized here comprises the alternative assignment of sensor signals to the two processors or, more specifically, the alternative assignment of the output signals of both processors to terminal stages in the fail situation.

If monitoring circuits detect disturbances in the corresponding processors, one of the terminal stages influencing the fuel metering is switched off via an AND-gate. However, a teaching is not provided as to how the two processors with primary and emergency functions and having the same capacity can be monitored. This publication especially does not provide any suggestion as to how a plurality of processors can monitor each other when both are utilized for different tasks and under certain circumstances are operated asynchronously.

SUMMARY OF THE INVENTION

In view of the foregoing, it is an object of the invention to provide a fuel metering system equipped with two processors with a most simple and yet powerful safety function. It is a further object of the invention to provide the fuel metering system with such a powerful safety function especially when both processors contribute to the processing capacity of the entire system in the same manner in the case where no disturbance is present.

Accordingly, the invention is directed to a system wherein an exchange of data must take place between both processors with this exchange taking place as long as no disturbance is present. It is necessary that the corresponding error be detected in order to guarantee the availability of the entire system when a processor becomes defective or when there are only errors in the data transmission. When an error is detected, the processors must react suitably in accordance with the nature of the failure in order to guarantee the availability of the system.

The arrangement for monitoring a computer system according to the invention provides that the two processors monitor each other to the same extent and that this monitoring takes place in the manner of a hand-shake operation in the context of a cyclic data exchange between both processors. In this connection, it is possible that the processors can start each other anew, for example after a disturbance effect is no longer present on the I/O-bus of one of the processors or if one of the two processors is permanently inoperable.

Pursuant to other embodiments of the invention, it is especially advantageous that: both processors can operate fully independently from each other; they do not have to utilize a directly coupled or common I/O-bus; and, that they are mutually asynchronously operable with different clock frequencies.

Finally, the arrangement according to the invention provides a mutual monitoring of two processors to the same extent such that a failure can be localized when it occurs. In this way, the arrangement according to the invention enables a recognition to be made as to whether a processor is defective or if a failure is present in the peripheral hardware of the processors. For this purpose, the cyclical data exchange between both processors referred to above is utilized as a hand-shake path for the monitoring function.

BRIEF DESCRIPTION OF THE DRAWINGS

The invention will now be described with reference to a single FIGURE which shows a block diagram of the arrangement according to the invention for monitoring a computer system with two processors in a motor vehicle.

DESCRIPTION OF THE PREFERRED EMBODIMENTS OF THE INVENTION

The drawing shows a first processor 10 having a gate 11 for feeding a data and control bus 17 and having an input/output (I/O)-bus 16. A second processor 20 is correspondingly provided and has a gate 21 for feeding the same data and control bus 17 and has an I/O-bus 26.

The processor 10 has two outputs 12 and 13. The output 12 drives a first pump circuit 27 via a line 33 and the output 13 drives the first input of a first AND-gate 29 via line 34. The output 12 delivers a watch-dog signal and the output 13 a software-reset signal.

The processor 10 has an input 14 which is driven by a second pump circuit 28 via a line 35 and another input 15 which is driven by a first OR-gate 32 via a line 36. The input 14 serves to receive a watch-dog signal and the input 15 to receive a reset signal.

The processor 20 likewise has two inputs 22 and 23. The input 22 is driven by the output of the first pump circuit 27 via lead 39 and the input 23 is driven from the output of a second OR-gate 31 via line 40. The inputs 22 and 23 are analog to the inputs 14 and 15 of the processor 10 for receiving a watch-dog signal and a reset signal, respectively.

In correspondence to processor 10, the processor 20 has also two outputs 24 and 25. The output 24 drives a second pump circuit 28 via line 37 and the output 25 drives a first input of a second AND-gate 30. The output of the first pump circuit 27 is connected to the second input of the first AND-gate 29 with the output of the latter driving the first input of the above-mentioned OR-gate 31 via a connecting line 41.

Correspondingly, the output of the second pump circuit 28 is connected to the second input of a second AND-gate 30 whose output drives the first input of the above-mentioned OR-gate 32 via the connecting line 42. An initialling signal (power-on pulse) can be supplied to the respective second inputs of the OR-gates 31 and 32 via a common control line 18 when the system is switched on.

The processors 10 and 20 to be monitored can, for example, be configured as master and slave processors in an E-gas system which includes an electronically-controlled accelerator pedal. In this connection, both processors operate asynchronously and completely independently of each other except for a cyclical data transmission.

The mutual monitoring occurs in each instance by means of the evaluation of the signal conditions on three parallel paths. The processor 10 is monitored by processor 20 for defects with the aid of a logical evaluation of the signal protocol as it results from the combination of three signal paths, namely the signal flow on the bus 17, the watch-dog signal on the line 33 and the software-reset signal on the line 34. The processor 20 is monitored by processor 10 for defects with the aid of a logical evaluation of the signal protocol as it results from the combination of three signal paths, namely the signal flow on the bus 17, the watch-dog signal on the line 37 and the software-reset signal on the line 38.

The processors 10 and 20 cyclically exchange data in a fixed time raster. It is assumed that first the processor 10 (as master) delivers a request for data to the processor 20 (slave) via the bus 17. The processor 20 expects a data request based on the permanently agreed cycling time. If then a data transmission from processor 20 to processor 10 is not forthcoming, the appropriate processor recognizes this. For example, processor 10 recognizes when its request for data is not responded to with a data transmission. In the same manner, processor 20 recognizes when no data request from processor 10 is received after a cycle has been run through. In this way, the bus 17 together with the signal flow taking place thereon and its comparison with the basic signal flow protocol defines a bidirectional, first causal path for monitoring both processors with respect to each other.

The processor 10 delivers a dynamic watch-dog signal to the pump circuit 27 via line 33 in the direction of the other processor and the processor 20 delivers a dynamic watch-dog signal to the pump circuit 28 via line 37 in the direction of processor 10. These watch-dog signals are as a rule in the form of a pulse. The pump circuits 27 and 28 are devices which generate a static output signal from the presence of an input pulse during a definite minimal time interval. With a positive logic serving as the basis, a logic 1 is provided at the output of such a pump circuit when the watch-dog pulse is applied to the input. This static output signal is in each instance read in by the other processor (watch-dog recognition). When the watch-dog signal is not present on lines 33, a logic 0 is read into the input 22 of processor 20 and when the watch-dog signal is not present on line 37, a logic 0 is read into the input 14 of processor 10. The omission of the watch-dog signal is an indication that an error is present in the corresponding processor which is detected in this manner by the other processor. In this way, the evaluation of the watch-dog status of both processors defines the second causal path for monitoring both processors with respect to each other.

Each processor has the possibility to start the other processor again when it fails (software-reset output). The condition precedent for supplying a reset pulse on the line 34 to the processor 20 and on the line 38 to the processor 10 is that the processor 10 recognizes a logic 1 on its input 14 as a consequence of the presence of a watch-dog signal at output 24 of processor 20 and that the processor 20 detects the presence of a logic 1 at its input 22 as a consequence of the presence of a watch-dog signal at the output 12 of processor 10. So that the processor 10 can not transmit reset pulses to processor 20 in an uncontrolled manner in the presence of a defect, the AND-gate 29 functions as a gate circuit in that the corresponding reset pulse is permitted to pass in the direction of the other processor only when a watch-dog signal of the transmitting processor is present. Likewise, so that the processor 20 can not transmit a reset pulse to the other processor 10 in the presence of a defect, the AND-gate 30 functions as a gate circuit in that the corresponding reset pulse is permitted to pass in the direction of the other processor only when a watch-dog signal of the transmitting processor is present. The OR-gates 31 and 32 permit a simultaneous reset of both processors when the entire system is activated; thus, for example, when the correspondingly equipped E-gas system is switched on. The exchange of software reset signals between both processors thereby defines the third causal path for monitoring both processors.

The following tests are conjugated with one another for coupling the three paths to recognize and localize errors and are evaluated as described below.

A defect in the control line of the data bus 17 is recognized if: the processor 10 recognizes that no data transmission results in response to a data request made to processor 20; or, processor 20 recognizes that no data request from processor 10 has been received after a transmitting cycle has been run through; and, both processors recognize in the same manner that the corresponding other processor nonetheless provides a watch-dog signal and is therefore active. On the other hand, when a defect of the data lines is present, a data transmission is still possible. The error on the data lines is recognized in that the processor 10 transmits a check word to the processor 20 which answers the processor 10 with a false check word. The processor 10 then recognizes the maintenance of the transmission protocol for the data exchange by processor 20 and the presence of the latter's watch-dog signal. However, the processor 10 can conclude that an error exists on the data lines of the data bus by means of an evaluation of the false check word and can then interrupt the data transmission. The processor 20 recognizes the maintenance of the transmission protocol by processor 10 and the presence of its watch-dog signal and, in the same manner, concludes that an error is present in the data bus.

If, for example, the processor 10 fails, then the processor 20 recognizes the omission of a data request from processor 10 as well as the absence of its watch-dog signal after the transmission cycle has been run through. The conjunctive recognition of both conditions leads to an evaluation of the defect in processor 10 by processor 20. Processor 20 then transmits a software-reset pulse to processor 10. As soon as processor 10 is again active, it transmits a watch-dog signal and again requests data from processor 20. If processor 10 does not become active, it transmits no watch-dog signal and makes no data request of processor 20 so that the latter reacts in correspondence to the program. The same applies in the reverse manner for processor 20.

If the watch-dog signal from processor 20 is absent, then processor 10 recognizes this situation. If processor 20 reacts correctly to the request for data of processor 10, then the latter recognizes that processor 20 is still active and localizes the error in the output 24 of processor 20 for the watch-dog signal. Processor 10 transmits this information over the data bus 17 to the processor 20. In the reverse manner, if an error occurs with the watch-dog signal of processor 10, processor 20 recognizes this and transmits the corresponding information to processor 10.

The arrangement according to the invention therefore provides that both processors monitor each other without difficulty even though they operate fully independently of each other. Depending upon the type of error, the processors can vary in their reaction in correspondence to the programmed fail-safe routines. Further, on the basis of a resulting localization of an error, it is possible to remove the error, for example, after the failure of a processor, the latter can be started anew by means of the processor which is still fully operational.

All together, the various software based possibilities for reacting increase the availability of the entire system considerably when a failure occurs. It is understood that a corresponding failure evaluation can be utilized for transmitting failure announcements such as to the driver of a motor vehicle. Finally, and as a departure from the embodiment shown in the drawing, the arrangement according to the invention can be applied to a two-processor system in which the exchange of data between the two processors does not take place over a special hard-wired bus 17 between special ports 11 and 21; instead, the exchange of data takes place by means of a system bus or a part of such a system bus via which generally detected measuring quantities are read in or process results are read out.

It is understood that the foregoing description is that of the preferred embodiments of the invention and that various changes and modifications may be made thereto without departing from the spirit and scope of the invention as defined in the appended claims.

What is claimed is:

1. An arrangement for monitoring a computer system with two equal access processors in a motor vehicle, the arrangement comprising:
    data and control lines interconnecting said two processors with each other;
    means for operating said processors independently of each other except for a cyclical data and command exchange via said data and control lines;
    each of said processors having a dedicated first output for supplying a dynamic watch-dog signal;
    each of said processors having a dedicated first input for identifying a static watch-dog signal;
    each of said processors having a dedicated second output for supplying a software-reset signal;
    said processors having respective reset inputs;
    two logic OR-circuits, each of said OR-circuits having an output connected to the reset input of the processor corresponding thereto;
    each of said OR-circuits having first and second inputs;
    means for applying a start pulse in common to the first inputs of each of said OR-circuits;
    two pump circuits corresponding to respective ones of said processors, each of said pump circuits having an input connected to the first output of the processor corresponding thereto and an output connected to the first input of the other one of the processors from which a static watch-dog signal can be taken in dependence upon an applied dynamic watch-dog signal;
    two logic AND-circuits, each of said AND-circuits having a first input connected to the second output of the processor corresponding thereto;
    each of said AND-circuits having a second input connected to the output of the pump circuit corresponding to the same processor as said AND-circuit for receiving the static watch-dog signal of the pump circuit; and,
    each of said AND-circuits having an output connected to the second input of the OR-circuit corresponding to the other processor.

2. The arrangement of claim 1, wherein said processors are operated at different clock frequencies different from each other.

3. The arrangement of claim 1, wherein check words issued via said control lines are different for the data transmission on the data lines in dependence upon direction.

4. The arrangement of claim 1, wherein one of said processors is a master and operable with priority and the other one of said processors is a slave and subordinately operable so long as no defect is present and, when a defect is detected, each of the two processors processes essentially the same emergency function with the same capacity.

* * * * *